Patented Nov. 21, 1922.

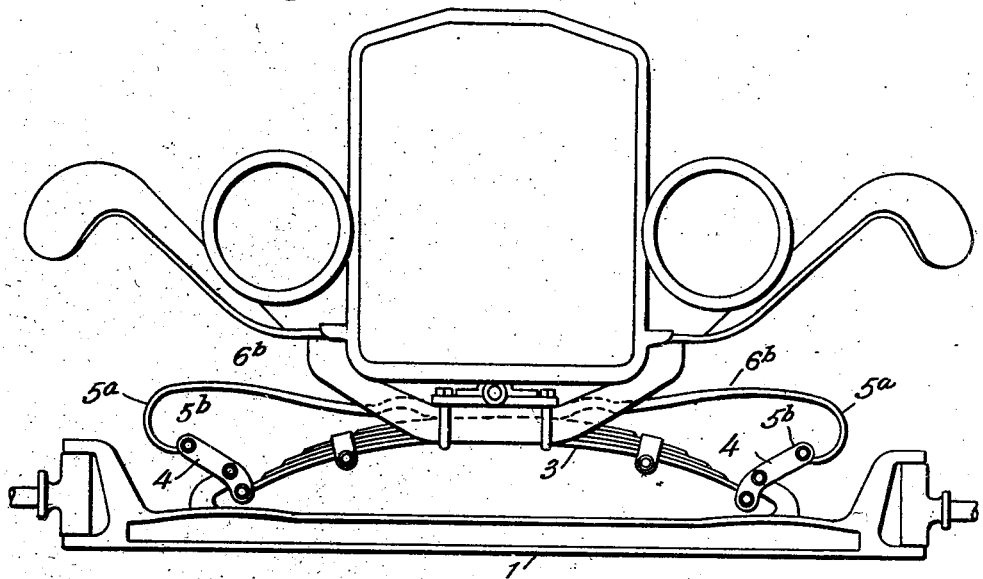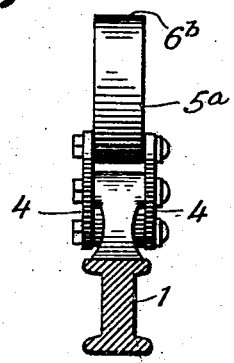

1,436,147

UNITED STATES PATENT OFFICE.

WILLIAM A. BUIS, OF BOISE, IDAHO.

SHOCK ABSORBER.

Application filed September 21, 1920. Serial No. 411,748.

*To all whom it may concern:*

Be it known that I, WILLIAM A. BUIS, a citizen of the United States, residing at Boise, in the county of Ada and State of Idaho, have invented certain new and useful Improvements in Shock Absorbers; and I do hereby declare the following to be a full, clear, and exact description of the invention, such as will enable others skilled in the art to which it appertains to make and use the same.

My invention relates to an auxiliary spring device or shock absorber adapted to cooperate with the main springs of a motor vehicle for the purpose of absorbing the sudden and extraordinary shocks imparted to the main springs when the same are compressed or when they rebound after the sudden compression.

My device is particularly, although not necessarily, adapted for use on the well known Ford car. This type of car has a particular disadvantage in that the main springs of the same are often broken due to the sudden compression of the same, as for instance when the vehicle goes into a rut in the road or over a sharp obstruction, and these springs have a further disadvantage in that on the rebound of the same, after any sudden compression, a breakage is also liable to occur. In addition to this the passengers in the vehicle are forcibly thrown upward upon the rebound of the spring, and the riding of the car over a rough road is therefore very uncomfortable. It is to alleviate these objections that I have devised the structure which will be described hereinafter, and a vehicle of this type on which my device is placed will be found to ride more easily and comfortably, and at the same time the breakage of springs is almost entirely eliminated.

A further object of my invention is to provide a device of this character which is simple in operation, which can be easily attached to the Ford car, and which has few parts and those of such a character that they are not liable to get out of order or break.

A further object of my invention is to provide a device of this character, which is adapted to take up the roll or side sway of the vehicle when turning corners, or when one side of the vehicle meets an obstruction which does not affect the other side.

Referring to the drawings in which like reference characters indicate like parts in the several views, Fig. 1 is a front view of a Ford automobile showing my improved auxiliary spring in position.

Fig. 6 is a front view of a car showing another modification of my invention, and Fig. 7 is a detail sectional view of the device shown in Fig. 6.

Figure 1:
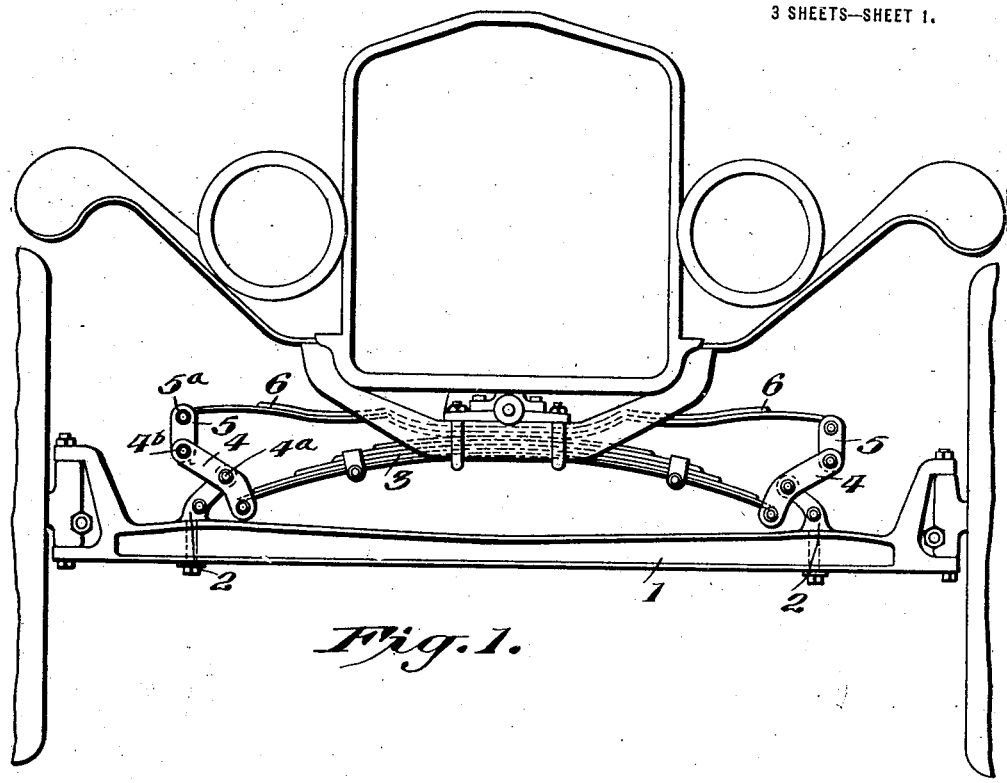

Referring to the drawings, numeral 1 indicates the front axle of a Ford automobile, having near each end a spring post 2, to which the ends of the main spring 3 are pivoted in Ford cars as heretofore ordinarily constructed. In my device the ends of the main spring 3 instead of being secured to the posts 2 rest upon or are pivotally attached to the lower ends of rocking arms 4 which are hung upon or pivoted intermediate their ends, as at 4ª, to the posts 2. The longer end of the arm 4 is pivoted, as at 4ᵇ, to one end of a connecting link or arm 5, the other end of which is pivoted to one end of an auxiliary spring 6, by means of any well known type of pivot pin. The auxiliary spring 6 extends substantially parallel with the main spring, and at its center extends into the channeled frame of the machine, and is tightly clipped to the frame at this point. At its opposite end the auxiliary spring is supported by a like series of arms 4 and 5, the former being likewise pivotally supported on the other post 2. It will be seen that the auxiliary spring by reason of the pivoted arms 4 and 5, will receive motion from the main spring 3, and whenever the main spring moves in an upwardly or downwardly direction, the auxiliary spring will likewise move in a reverse direction as will be hereinafter more fully explained.

Figure 2:
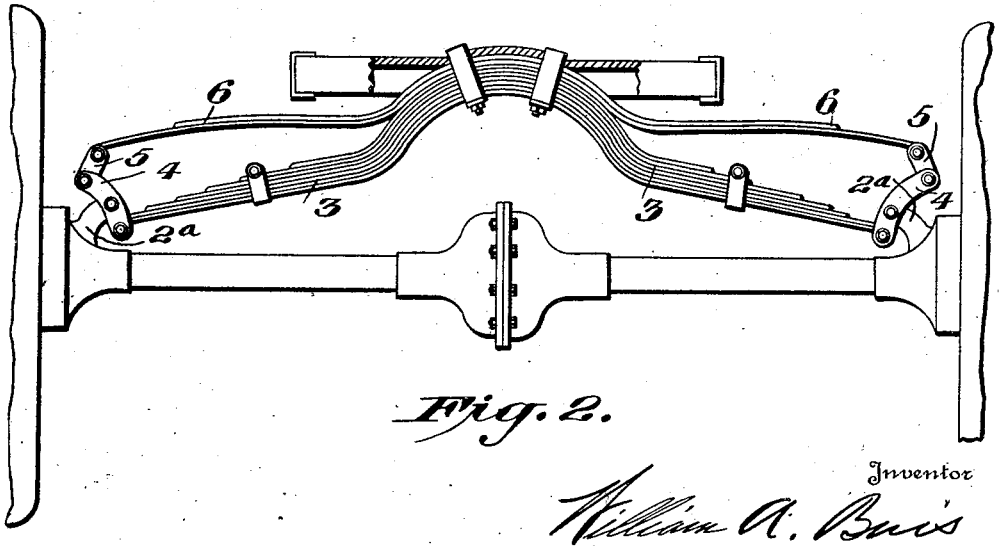
Fig. 2 is a rear view of a Ford car showing my device attached to the rear spring of the same.

Referring to Fig. 2, my device is shown as applied to the rear springs of a Ford car which are slightly different in contour from the front springs. However, the structure of auxiliary spring and the operation of the same are identically similar to that described for Fig. 1, the posts 2ᵃ—2ᵃ being the usual spring posts connected to each end of the axle housing, and the arms 4—4 and 5—5 are arranged in a similar manner to that described with reference to Fig. 1. In Fig. 2, the auxiliary spring, 6, is clipped into the rear frame of the machine at its center, and adapts itself in contour substantially to the shape of the main spring 3, or it may be attached at its center to the car frame by any suitable fastening device.

In the operation of my device with reference to Figs. 1 and 2, it will be seen that upon a downward movement of the main spring 3, the arms 4—4 will be swung on their pivots 4ᵃ—4ᵃ, and will move the arms 5—5 in an upward direction. The arms 5—5 being connected to the ends of the auxiliary spring 6, the auxiliary spring will be flexed upwardly, and the upward movement of the arms 5—5 will thereby be opposed by the tension of the spring 6, and the latter will absorb and counteract the downward movement of the main spring 3. When the main spring sharply rebounds after compression, this upward movement of the main spring will turn the arms 4—4 in a reverse direction to that just described, and the latter will thereby draw the arms 5—5 and the auxiliary spring 6 downwardly past their normal position and the latter will now flex in a downward direction, and absorb further movement of the main spring. It will thus be seen that every movement of the main spring, 3 is reversely imparted to the auxiliary spring, and the tendency of the latter is to absorb the unusual shocks due to the sudden compression or rebound of the main spring, in the manner described. Besides acting as a shock absorber this auxiliary spring also has the effect of lengthening the spring structure of the vehicle, and thereby makes the car ride considerably easier. By the provision of this auxiliary spring extending entirely across the frame of the machine, and attached to the frame at its center, and likewise by reason of the slight lip given the auxiliary spring at its center, in Fig. 1, and its slight convexity, as shown in Fig. 2, adapted to follow the contour of the frame of the vehicle at each of these points, the roll or side swing of the vehicle is almost totally eliminated, and the vehicle will be maintained in a substantially upright position due to the action of these auxiliary springs in bearing against a portion of the frame of the vehicle to oppose sidewise movement thereof.

Figure 3:
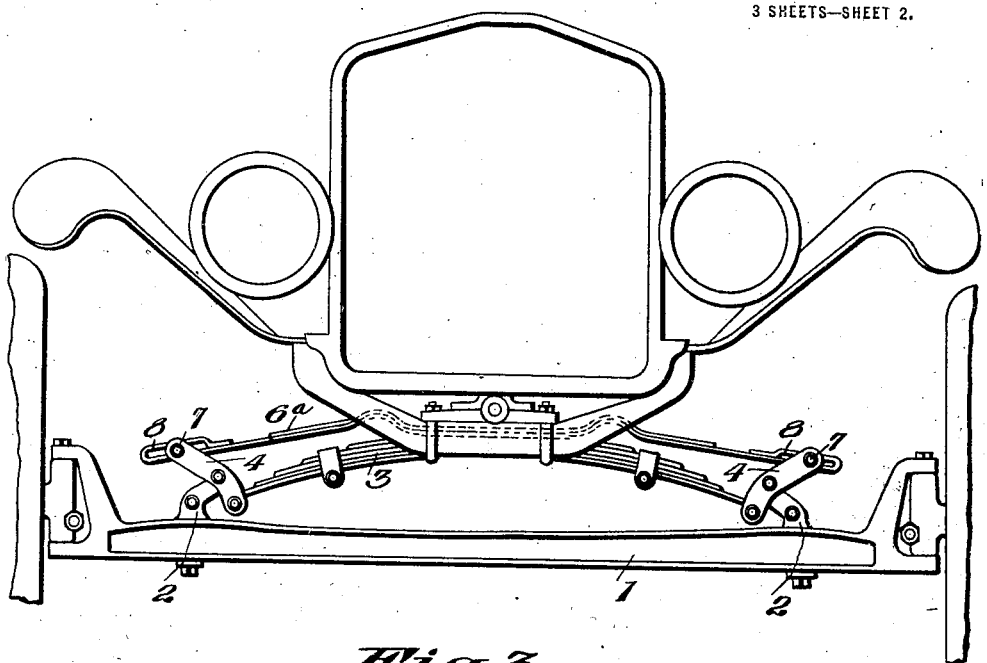
Fig. 3 is a front view of a Ford car showing a modification of my device.

Referring to the structure shown in Fig. 3, I have provided the arms 4—4 as described with reference to Figs. 1 and 2, but at the upper end of the arms 4—4 are the pins 7—7, and these pins are adapted to enter and slidably move within the loops 8—8 formed on the ends of the auxiliary springs 6ᵃ. In the operation of the device shown in this figure, it will be seen that the auxiliary spring 6ᵃ will not come into movement until the pins 7—7 have reached the ends of the loops 8—8, and the main spring can thereby move in either direction throughout a slight portion of its total movement before the auxiliary spring cooperates therewith to absorb the shock. As soon as the pins 7—7 reach either end of the slotted loops 8, they will impart movement to the auxiliary spring 6ᵃ and thereby flex the same upwardly or downwardly as the case may be.

Referring to the modification shown in Fig. 4, I have provided two auxiliary spring devices, the first of which, 6, is constructed and arranged, and attached to the main spring 3, in the manner described with reference to Fig. 1, by means of the arms, 4 and 5. In addition to this auxiliary spring 6, I have provided a second auxiliary spring 10, and the latter is adapted to receive movement only after the main spring and the auxiliary spring 6 has moved a certain distance. This result is accomplished by the provision of a pin 9, projecting from the arm 4, at the point of the latter's engagement with the arm, 5, and this pin is slidably mounted within a loop 11, carried by the end of the second auxiliary spring 10.

Figure 4:
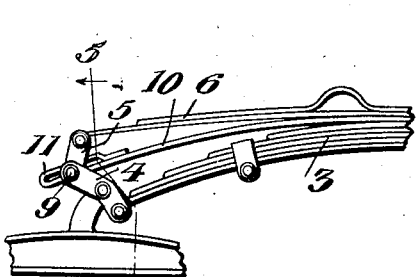
Fig. 4 is an elevation of a fragment of a spring showing another modification of my invention.
Figure 5:
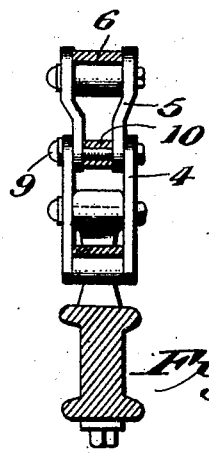
Fig. 5 is a section on the line 5—5 of Fig. 4.

In the operation of the structure shown in Fig. 4, upon downward movement of the main spring 3, the auxiliary spring 6 will be flexed upwardly in the manner as described for Fig. 1. When the arm 4 has reached a point in its movement where the pin 9 carried thereby can engage with the inner end of the loop 11, the second auxiliary spring 10, will be brought into play, and will move upwardly, and will thereby additionally serve to absorb the shock and movement of the main spring 3.

In the modification shown in Figs. 6 and 7, the auxiliary spring 6ᵇ is formed with a goose-neck bend 5ᵃ at each end, that will spring or yield under pressure, and the inturned free ends of said portions 5ᵃ, which underlie the main end portions of the spring 6ᵇ, are secured, preferably by pivot pins 5ᵇ, to the upper ends of the rocking arms 4, thus taking the place of the connecting links 5 and being adapted to perform a similar function.

From the foregoing it will be seen that I have provided a device of the character described which will act in a positive manner as an auxiliary and shock absorbing spring, and which will relieve the main spring of the strain normally placed thereon, and will thereby prevent the breakage of the main spring, and in addition to these qualities, will vastly improve the comfort and riding ease of the car. While I have shown the device in all instances as applied to a Ford car, it may obviously be used on any other type of vehicle where the springs are mounted parallel with the front and rear axles, and the arms 4, 4, can be pivoted on posts attached to the axle, where such posts do not normally exist as in the Ford car. This structure as described might also be used in connection with cars having their springs arranged at right angles to the axle and within the limits of the structure as defined in the appended claims.

As will be seen, this device may be applied to a used Ford or other car having posts or other supports thereon to which the ends of the spring 3 are pivoted, by removing the pivot bolts and attaching the rocking arms 4 to said posts and connecting the ends of the spring to the lower ends of said arms, as shown, or it may be originally applied to the car in course of construction.

Having thus described my invention what I claim as new and desire to secure by Letters Patent is:—

1. A compound vehicle spring and shock absorber comprising a two-armed rocking lever fulcrumed on one side of the vehicle body, the respective arms of said lever disposed outwardly and upwardly and inwardly and downwardly of the fulcrum thereof, a main and an auxiliary spring element mounted on the vehicle body, said auxiliary spring being end of one spring connected to one arm of the rocking lever, so as to allow relative movement between the end of the lever and the end of the auxiliary spring, and one end of the other spring connected to the other arm of said lever, whereby the respective movements of said springs are reciprocally co-active, substantially as set forth.

2. A compound vehicle spring and shock absorber comprising a two-armed rocking lever fulcrumed on one side of the vehicle body, the respective arms of said lever disposed outwardly and upwardly and inwardly and downwardly of the fulcrum thereof, a link mounted on one of said arms, and a main and an auxiliary spring element mounted on the vehicle body, an end of one of the springs connected to said link and an end of the other spring connected to the free arm of the rocking lever, whereby the respective movements of said springs are reciprocally co-active, substantially as set forth.

3. A combined vehicle spring and shock absorber comprising a pair of two-armed rocking levers each fulcrumed on the vehicle body at one side thereof, the respective arms of said levers being disposed upwardly and outwardly and downwardly and inwardly of the fulcrum thereof, and a main and an auxiliary spring mounted transversely of the vehicle body and pivotally connected to said rocking levers; said main spring being connected at each end to one arm of one of said rocking levers and the other arm of the rocking lever connected to one end of said auxiliary spring so as to allow relative movement between the end of the lever and the end of the auxiliary spring, substantially as described.

In testimony whereof I affix my signature in the presence of two witnesses.

WILLIAM A. BUIS.

Witnesses:
 ENID QUIVEY,
 R. M. McCRACKEN.